June 22, 1926.
F. F. HALLMAN
PUNCH
Filed Dec. 27, 1924
1,589,527
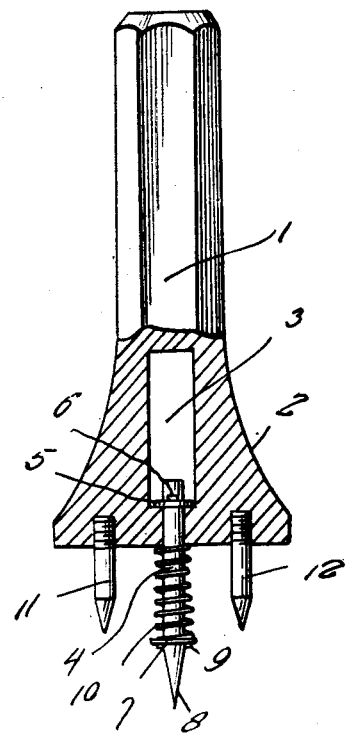
F. F. Hallman,
Inventor
By Clarence O'Brien
Attorney Patented June 22, 1926.

1,589,527

UNITED STATES PATENT OFFICE.

FOSTER F. HALLMAN, OF WEST BERKELEY, CALIFORNIA.

PUNCH.

Application filed December 27, 1924. Serial No. 758,412.

This invention relates to improvements in punches and has for its primary object to provide a tool which is particularly adapted to be used in connection with the securing of the male part of the type of fasteners which are associated with an automobile body for receiving the female part of the fasteners associated with the automobile curtain.

One of the important objects of the present invention is to provide a tool of the above mentioned character, whereby the center of the male part of the fastener is located thus permitting the male part of the fastener to be secured on the part of the automobile body in proper position for interfitting engagement with the female part of the fasteners so that the automobile curtain may be properly secured on the automobile.

A further object of the invention is to provide a tool of the above mentioned character, which will save considerable time and labor in marking the places on the automobile body where the male parts of the fasteners are to be secured.

A still further object is to provide a tool of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

The figure represents a view partly in elevation and partly in section of the punch embodying my invention.

In the drawing, wherein for the purpose of illustration is shown the preferred embodiment of my invention, the numeral 1 designates the shank portion of the tool, the lower end thereof being enlarged as illustrated at 2. A longitudinally extending slot 3 is provided in the central portion of the enlarged head 2.

A center punch 4 has its upper end extending through the bottom of the enlarged lower portion 2 and into the slot 3. A washer 5 is associated with the upper end of the center punch 4 and is disposed within the slot 3, the washer 5 limiting the downward movement of the center punch. A cotter pin or the like shown at 6 extends through the upper portion of the center punch 4 and prevents the displacement of the washer therefrom. A similar washer 7 is secured on the lower portion of the center punch 4 adjacent the pointed end 8 thereof by means of a cotter pin 9. A coil spring 10 encircles the center punch 4 and is disposed between the washer 9 and the bottom of the enlarged portion 2. The coil spring 10 is of the expansible type and normally holds the center punch in the position as shown in the drawing.

A pair of punches 11 and 12 respectively are detachably threaded at their upper ends in suitable sockets provided therefor in the bottom of the enlarged portion 2 of the tool, the punches 11 and 12 being equally spaced from the center punch 4 and arranged on opposite sides thereof. The punches 11 and 12 are of a shorter length than the center punch 4 as is clearly illustrated in the drawing. The punches 11 and 12 are arranged in such a manner as to permit the centers of the openings provided at the ends of the male part of the type of fasteners such as are employed in connection with automobile curtains to be located whereby the male part of each fastener will be properly secured on the various parts of the automobile body and thus enable the same to cooperate with the female parts of the fasteners which are associated with the curtains in securing the curtains in proper position.

In the use of my improved tool, the center where the female part of the fastener comes is located, the point 8 of the center punch 4 being placed at such center. A hammer or the like is then forced against the upper end of the shank 1 causing the downward movement of the tool whereby the points of the punches 11 and 12 will indent the portion of the automobile body to which the male part of the fastener is to be secured, in the meantime the coil spring 10 will be placed under tension, causing the upper portion of the center punch to move upwardly within the slot 3. As soon as the punches 11 and 12 have made the necessary indentures, the spring 10 will return the center punch to its normal position, thus permitting the tool to be disengaged from the automobile body and the male part of the fastener may then be properly secured thereon and in such a manner as to insure the male part of the fastener to cooperate with the female part in properly securing the curtain on the automobile.

The provision of a tool of the above mentioned character, will save considerable time and labor in locating the centers for the openings in the male part of the fasteners and will at all times be positive and efficient in its operation.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A tool of the class described comprising a shank portion having a longitudinally extending slot in its intermediate portion and a bore leading from one end of the slot to the adjacent end of the shank portion, a center punch movable through the bore having one end disposed within the slot, a pin piercing said end of the punch, a washer held on said end of the punch by said pin, a second pin piercing the punch adjacent its other end, a washer on said punch abutting said last mentioned pin, and a spring between said last mentioned washer and said end of the shank portion whereby the first mentioned washer is normally held in abutment with said end of the slot, and an additional pair of punches detachably engaged with said end of the shank portion, one on each side of the first mentioned punch.

In testimony whereof I affix my signature.

FOSTER F. HALLMAN.